United States Patent [19]

Ota et al.

[11] 4,307,137
[45] Dec. 22, 1981

[54] METHOD FOR FORMING AN OPTICAL DESIGN PATTERN IN POLYETHYLENE TEREPHTHALATE ARTICLES, AND METHOD FOR STRENGTHENING AN OPTICAL DESIGN PATTERN FORMED BY SAID METHOD

[75] Inventors: Akiho Ota, Funabashi; Fumio Negishi, Tokyo, both of Japan

[73] Assignee: Yoshino Kogyosho Co., Ltd., Tokyo, Japan

[21] Appl. No.: 94,820

[22] Filed: Nov. 16, 1979

[30] Foreign Application Priority Data

Apr. 24, 1979 [JP] Japan ............................ 54-50428

[51] Int. Cl.³ .................... B32B 3/00; B29C 9/00; B29C 17/07; B29F 1/10
[52] U.S. Cl. ............................... 428/35; 264/513; 264/516; 264/246; 264/247; 264/250; 264/274; 428/161; 428/163; 428/480; 428/910
[58] Field of Search .............. 264/1, 246, 247, 250, 264/255, 274, 513, 516, 1.7; 215/1 C; 428/35, 36, 161, 163, 480, 910

[56] References Cited

U.S. PATENT DOCUMENTS

| | | | |
|---|---|---|---|
| 2,160,108 | 5/1939 | Reid | 264/516 |
| 2,663,910 | 12/1953 | Danielson et al. | 264/247 |
| 3,284,259 | 11/1966 | Galloway et al. | 264/516 |
| 3,733,309 | 5/1973 | Wyeth et al. | 264/513 |
| 3,821,349 | 6/1974 | Mozer | 264/237 |
| 4,107,362 | 8/1978 | Valyi | 264/513 |
| 4,127,693 | 11/1978 | Lemelson | 428/163 |
| 4,198,457 | 4/1980 | Saito et al. | 428/161 |

FOREIGN PATENT DOCUMENTS

| | | | |
|---|---|---|---|
| 1231866 | 10/1960 | France | 264/247 |
| 51-49260 | 4/1976 | Japan | 215/1 C |

*Primary Examiner*—Jan H. Silbaugh
*Attorney, Agent, or Firm*—Fidelman, Wolffe & Waldron

[57] ABSTRACT

Formation of an optical design pattern in an article of polyethylene terephthalate by utilizing the property of polyethylene terephthalate to become crystallized and whitened upon slow cooling and the fact that cooling of a plastic article molded within a mold advances from the surface portion of the article in contact with the surface of the mold toward the wall of the article. Based on this theory, a desired portion of the wall of an article of polyethylene terephthalate is whitened by properly controlling the degree and speed of cooling of the polyethylene terephthalate article in the mold to cool it slowly. The whitened portion in the wall is developed as an optical design pattern that can be viewed from outside. The whitened optical design pattern developed by the aforesaid technique can be made more distinct by heat treatment and stretching treatment.

10 Claims, 7 Drawing Figures

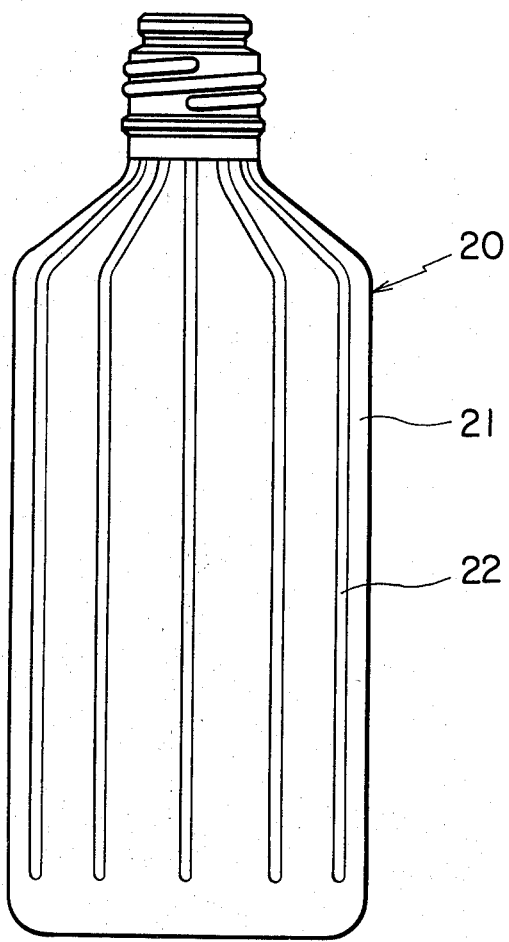

METHOD FOR FORMING AN OPTICAL DESIGN PATTERN IN POLYETHYLENE TEREPHTHALATE ARTICLES, AND METHOD FOR STRENGTHENING AN OPTICAL DESIGN PATTERN FORMED BY SAID METHOD

This invention relates to a polyethylene terephthalate article having an optical design pattern formed thereon for decorative purposes. Specifically, it relates to a method for forming an optical design pattern in a polyethylene terephthalate article, and to a method for strengthening an optical design pattern formed by this method.

There are various types of decoration of plastic articles, and most of them are based on direct or transfer printing of decorative designs on their outside surfaces.

Various decorative designs have been obtained by direct or transfer printing and also by vacuum deposition, and have exhibited their own decorative effects. However, none of them utilize the inherent properties of plastic materials that form the matrix of the plastic articles.

In recent years, a light-shade subdued decorative effect has been preferentially desired to brilliant decorations obtained by the aforesaid decorative means. However, it has been difficult to realize such a decorative effect because the aforesaid decorating means cannot give "depth". This is especially remarkable in blow-molded articles which are typical plastic articles, and decoration of a light-shade appearance having depth is quite impossible in blow-molded articles.

Polyethylene terephthalate has come into widespread use because of its excellent properties and characteristics. On the other hand, it has the inherent property of developing a crystal nucleus at different rates depending upon the difference in the speed of cooling. For this reason, in the molding of polyethylene terephthalate, its temperature control is more difficult than other plastic materials. In particular, when cooling is slow, the polyethylene terephthalate article becomes opalescent or whitened, or even when it does not become opalescent, a crystal nucleus occurs to cause non-uniformity of the refractive index of the article. A portion where a crystal nucleus occurs has lower mechanical strength and light permeability than other parts of the article. Consequently, this reduces the advantage of good transparency inherent to polyethylene terephthalate.

The present invention is directed to the formation of a desired design pattern on a polyethylene terephthalate article by utilizing the aforesaid property of polyethylene terephthalate which has heretofore been regarded as undesirable. It is characterized by the fact that a design pattern of the desired configuration is formed by slowly cooling predetermined areas of a polyethylene terephthalate material to change the light transmissivity or refractive index of these areas, or to render these areas opalescent or whitened. This method does not require pigments or other additives as in the prior art in developing a design pattern. This offers the advantage that the excellent properties of polyethylene terephthalate are not likely to be deteriorated, and molded products with design patterns can be formed at low cost.

The present invention pertains to a method for forming an optical design pattern in a polyethylene terephthalate and to a method for strengthening an optical design pattern formed by this method. More specifically, its primary object is to provide a polyethylene terephthalate article having a novel appearance and a decorative effect by forming an optical design pattern, within the wall of the article.

Another object of this invention is to increase the decorative effect of an optical design pattern by biaxially stretching a polyethylene terephthalate article having the optical design pattern formed therein.

Other objects and advantages will become apparant from the following description taken in conjunction with the accompanying drawings in which:

FIG. 7 is a front elevation of a bottle obtained by biaxial stretching-blow molding of a piece molded from the primary piece shown in FIG. 1.

Figure 1:
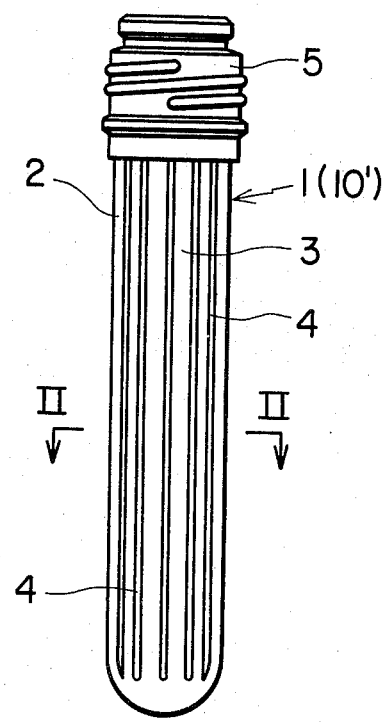
FIG. 1 is a front elevation of a primary piece obtained by molding.
Figure 3:
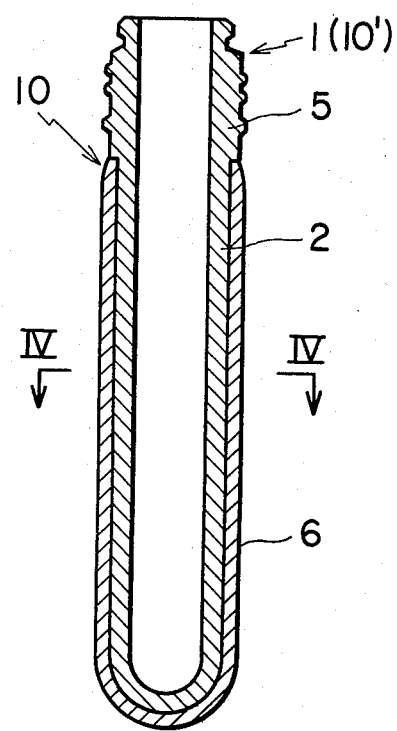
FIG. 3 is a longitudinal sectional view of a piece produced by providing a wall in the body portion of the primary piece by insert molding.
Figure 2:
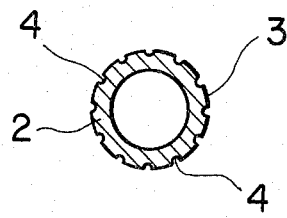
FIG. 2 is a cross-sectional view taken along the line II—II of FIG. 1.
Figure 4:
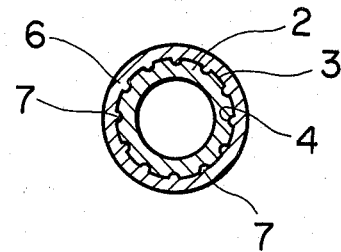
FIG. 4 is a cross-sectional view taken along the line IV—IV of FIG. 3.
Figure 5:
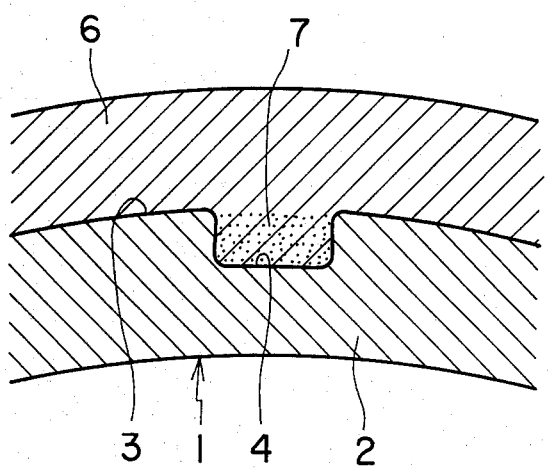
FIG. 5 is an enlarged view of principal parts in FIG. 4.

The present invention is described below with reference to these drawings.

According to this invention, an optical design pattern of a prescribed profile can be formed by properly controlling the cooling operation during cooling and solidifying a polyethylene terephthalate article, to place a prescribed part of the desired shape of this article in a slow cooling condition, thereby increasing the rate of occurrence of a crystal nucleus and reducing the light transmissivity of the aforesaid part and also changing its refractive index.

Specifically, depressed portions 4 of the desired configuration and depth are formed either or the inside or outside surface 3 (the outside surface in the embodiment shown in the drawings) of a primary molded article 1 of a suitable synthetic resin. Using the surface 3 of the primary molded article 1 having depressed portions 4 as a part of the surface of a mold, a wall member 6 is formed of polyethylene terephthalate by injection molding. During the operation of cooling and solidifying the wall member 6, the power of cooling the wall member 6 and the rate of cooling are controlled so that packing portions 7 of the wall member 6 which are located within the depressed portions 4 are slowly cooled. As a result, a crystal nucleus of the polyethylene terephthalate is developed at a very high rate in the packing portions 7, thereby to form an optical design pattern. In other words, the packing portions 7 located within the depressed portions 4 form an optical design pattern.

The degree of crystallization of the polyethylene terephthalate at the packing portions 7 varies depending upon the degree of slow cooling of the packing portions 7. As the degree of crystallization is higher, the packing portions 7 increase in the degree of opalescence, and finally become non-transparent. When the degree of crystallization of the packing portions 7 is low, the light transmissivity does not so much decrease, and only the light refractive index changes. But as the degree of crystallization increases, the light transmissivity decreases, and finally opalescence appears.

Thus, whether the optical design pattern to be formed by the packing portions 7 is to be that formed by the refraction of light, or that formed by deep opalescence, or that formed by semi-transparent opalescence and also the refraction of light is predetermined properly by controlling the cooling of the wall member 6.

When the design pattern is to be formed by utilizing the refraction of light, the primary molded article 1 should naturally be transparent, and the wall member 6 should also be transparent. Since polyethylene terephthalate has very good transparency, the molding material for the primary molded article 1 should also require high transparency although it may either be colored or colorless. Accordingly, it is desirable to mold the primary molded article 1 also form polyethylene terephthalate.

When an opalescent design pattern is to be utilized, it is not necessary for both of the primary molded article 1 and the wall member 6 to be transparent at the same time, and it is sufficient if the material located on the outside of the product is transparent. When the wall member 6 is located inwardly and is non-transparent and the primary molded article 1 is transparent, the degree of opalescence of the packing portions 7 does not appreciably appear on the outside owing to the pigment added to the wall member 6. Hence, the effect of development of a design pattern by opalescence is reduced. Thus, when it is desired to form an opalescent design pattern, it is desirable to position at least the wall member 6 outwardly, and also to make the wall member 6 transparent.

Of course, the primary molded article 1 located inwardly may be made transparent. When the primary molded article 1 is transparent, it should also be desirably made of polyethylene terephthalate in view of the light transmissivity.

When both of the primary molded article 1 and the wall member 6 are transparent, the opalescent design pattern developed is positioned in the wall of the product, thus presenting a solid feeling.

The method for forming an optical design pattern in accordance with this invention is not limited to the type of design pattern based on variations in refractive index or the type of design pattern based on opalescence, and both types of design pattern may be developed together.

Figure 6:
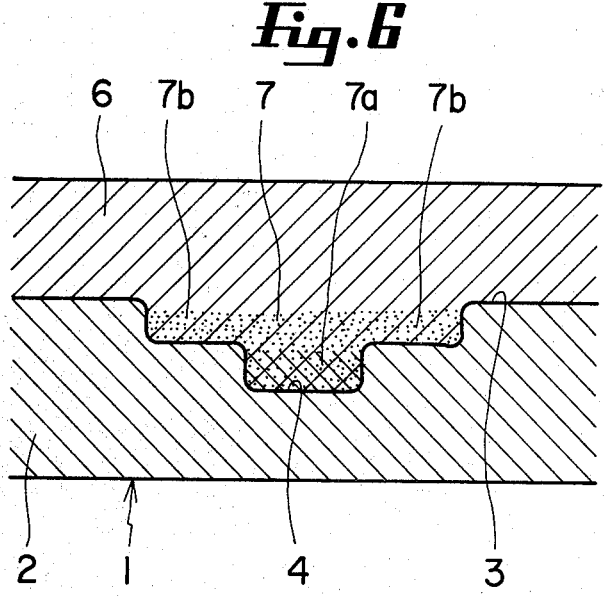
FIG. 6 is an enlarged cross sectional view of a principal part of another embodiment of the structure of a depressed portion.

When the depressed portion 4 is formed stepwise as shown in FIG. 6, a part 7a of the packing portion 7 which is located at a deep position undergoes less cooling action than a part 7b located at a shallower position. Accordingly, within the packing portion 7, the part 7b can be made relatively transparent but caused to have a different refractive index, and the part 7a can be made completely opalescent. In this case, the surrounding of the design pattern developed by opalescence is viewed such that it exhibits a prism effect different from the other parts.

When instead of providing steps in the depressed portion 4 as shown in FIG. 6, the surface of the depressed portion 4 is inclined as far as it reaches the bottom (not shown), the resulting opalescent design pattern is highest in density at its center, and toward the periphery of the pattern, the degree of opalescence progressively becomes lower until at least complete transparency is attained.

According to the method of forming an optical design by the present invention, the design pattern is formed simultaneously with the operation of molding polyethylene terephthalate by utilizing its characteristics, as described hereinabove. Now, one embodiment of the method of strengthening the optical design pattern formed by the method of this invention will be described.

A primary piece 10' of polyethylene terephthalate is formed by injection molding as a primary molded article 1 having the shape of a tubing with a bottom.

In the embodiment shown in FIG. 1, this primary piece 10' consists of a mouth portion 5 having a screw thread formed on its peripheral surface and a body portion 2 having the shape of a tubing with a bottom. Depressed portions 4 in the shape of vertical grooves are formed on the outside surface 3 of the body portion 2. The thickness of the body portion 2 is about half of that of the body portion of an ordinary piece of this kind. Then, using the outside surface 3 of the body portion 2 having the depressed portions 4 formed thereon as a part of the surface of a mold, a wall member 6 of polyethylene terephthalate is formed by insert molding so that it covers the entire body portion 2. Thus, a piece 10 is formed.

During the molding of the piece 10, cooling is controlled so that packing portions 7 within the depressed portions 4 which form part of the injection-molded wall member 6 are cooled slowly. By controlling the cooling of the wall member 6, the packing portions 7 undergo an optical change in contrast to the wall member 6, and for example, become opalescent. Thus, an optical design pattern having the same form as the depressed portions 4 is developed in the piece 10.

The piece 10 is re-heated to a temperature at which a stretching effect is produced. Then, a bottle 20 as shown in FIG. 7 is formed by a known biaxial stretching-blow molding method. At this time, the optical design pattern of the same shape as the depressed portions 4 appear as a design pattern 22 (FIG. 7). In this operation, the body portion 2 having the packing portions 7 which develop the design pattern is biaxially stretched to a great extent, and it seems that the optical effect of the packing portions 7 will be reduced. In fact, however, the optical design is never reduced. But rather, in case of developing opalescence, the design pattern 22 appearing in the body portion 21 becomes more distinct by the effect of the increased transparency of the other portions.

This applies not only to the development of the pattern 22 by opalescence but also to be development of the pattern by variations in refractive index. The changed refractive index at the packing portions 7 will never be returned to the original by the stretching action.

The degree of opalescence at the pattern 22 is slightly higher in density than it was in the piece 10. This is a relative phenomenon which occurs as a result of the great increase in the degree of transparency of the body portion 21 by biaxial stretching. In other words, at the time when the piece 10 is formed, a crystal nucleus occurs at a considerably high rate in the packing portions 7, and therefore, a primary optical design pattern appears in the body portion of the piece 10.

When the piece 10 in this state is re-heated to a temperature at which a stretching effect is produced and is formed into the bottle 20 by biaxial stretching-blow molding, the packing portions 7, which are liable to undergo thermal effect as a result of the occurrence of crystal nuclei at a high rate, undergo the thermal effect more strongly than the other parts during the heating and cooling operations in the biaxial stretching-blow molding operation. Consequently, the crystallization of the packing portions 7 is accelerated, and their optical effect is strengthened.

Thus, because of the acceleration of the crystallization of the packing portions 7 by the biaxial stretching blow molding operation coupled with the increase of the transparency of the other parts, the degree of appearance of the design pattern 22 is greater in the bottle 20 than in the piece 10.

Since the design pattern 22 is formed by utilizing the properties of polyethylene terephthalate resin, no special additive or other substance is required to develop the design pattern 22, and only the controlling of the cooling temperature suffices. Accordingly, the superior properties and characteristics of polyethylene terephthalate can be exhibited effectively.

Furthermore, because the design pattern 22 is located within the wall of the finished article, the state of the pattern at the time of molding can be retained permanently, and there is no likelihood that the decoration of the product will be deteriorated. Furthermore, since the design pattern 22 is located within the wall of the product, it has a depth of solid feeling, and can be obtained in a light shade and with a subdued feeling even when it is formed as an opalescence pattern.

The form of the design pattern 22 is not limited to the linear pattern shown in FIG. 7. It is possible to form a pattern in which the opalescent portion has a certain extent of area.

As clearly seen from the above description, since the design pattern in accordance with this invention is formed by utilizing the properties of polyethylene terephthalate, it can be exactly developed, and the degree of development of the design pattern can be freely controlled. Moreover, the design pattern can be formed in any desired configuration. Strengthening of the optical design pattern also results in the strengthening of the various properties and characteristics of the product itself, and therefore, good products can be obtained. The developed pattern 22 has a solid feeling and a subdued shade, and its decorative effect is not reduced.

What is claimed is:

1. A method for forming an optical design pattern in an article comprising polyethylene terephthalate which comprises:

forming a primary molded article of a synthetic resin, said primary article having recessed portions on at least one surface thereof arranged in a design pattern;

forming a wall member by injection molding polyethylene terephthalate about the recessed surface of the primary article, said primary article functioning as a portion of a mold, and cooling and solidifying said wall member to form a composite structure with said primary molded article at a cooling rate at which those portions of said wall member filling recessed portions of said primary article cool more slowly and display a reduced light transmissivity than do the non-recessed areas of said wall member to thereby form an optical design pattern upon solidification of the composite structure.

2. The method of claim 1 wherein said synthetic resin forming the primary molded article is also polyethylene terephthalate.

3. The method of claim 1 wherein said primary molded article is transparent.

4. The method of claim 1 wherein the non-recessed areas of said wall member are transparent.

5. The method of claim 1 wherein said wall member is cooled and solidified at a rate whereat those portions of the wall member filling recessed portions on the primary article surface are rendered opalescent upon cooling.

6. An article comprising polyethylene terephthalate carrying an optical design pattern produced by the process of claim 1.

7. A method for producing and enhancing an optical design pattern in an article formed of polyethylene terephthalate which comprises:

forming a primary molded article of polyethylene terephthalate said primary article having recessed areas on at least one surface thereof arranged to define a pattern;

forming a wall member by injection molding polyethylene terephthalate about the recessed surface of the primary article; said primary article functioning as a mold surface;

cooling and solidifying said wall member to form a composite structure with said primary article at a cooling rate at which those portions of said wall member filling recessed areas of said primary article cool more slowly and display a reduced light transmissivity than do the non-recessed areas of said wall member to thereby form an optical design pattern upon solidification of the composite structure;

reheating said composite structure to a temperature which allows biaxial stretching of polyethylene terephthalate, and biaxially expanding said composite structure.

8. The method of claim 7 wherein said composite structure is biaxially expanded by blow molding.

9. The method of claim 8 wherein said composite structure is expanded into bottle form.

10. A biaxially expanded polyethylene terephthalate article carrying an optical design pattern produced by the process of claim 7.

* * * * *